United States Patent Office 2,722,869
Patented Nov. 8, 1955

2,722,869

MAKING FELT CONTAINING CORK GRANULES

Edward M. Archer, Berlin, N. H., assignor to Brown Company, Berlin, N. H., a corporation of Maine No Drawing. Application April 3, 1953,
Serial No. 346,810

3 Claims. (Cl. 92—39)

This invention relates to waterlaid fibrous sheet materials containing cork granules dispersed therein and to a method of manufacturing such sheets.

One object of this invention is to provide a method for dispersing cork granules substantially uniformly into a water suspension of fibrous material such as cellulose fiber of the type ordinarily used for paper manufacture.

Another object is to provide a waterlaid felt containing cellulose fibers together with cork granules dispersed substantially uniformly therein.

Another object is to provide a cushion insole material for footwear, the material being in the form of a waterlaid felt impregnated with a wet-strengthening resin and containing cellulose fibers and cork granules dispersed substantially uniformly throughout the felt.

Other objects will be apparent from the description which follows.

It has heretofore been proposed to manufacture insoles for footwear by laminating a sheet of cork granules, formed by adhering the granules to each other by means of a binder, to a fibrous supporting sheet. Such a procedure is time-consuming and expensive, particularly since it involves forming the cork granules into a block by means of the binder, then slicing the block to produce the desired sheets.

Attempts to mix the granules with a fibrous material in a beater such as is employed in conventional papermaking practice have proved unsuccessful in that the granules tend to float upon the surface of the aqueous suspension or slurry, resulting in a non-uniform dispersion of the granules and preventing them from being firmly held by the fibers in the finished felt product.

I have now discovered that cork granules may satisfactorily be added to an aqueous suspension containing fibrous material in a beater, provided that the air content of the granules is first displaced by a liquid having a specific gravity at least as great as that of water. Preferably, the volatility of the liquid is at least substantially as great as that of water in order to facilitate the drying of the web on a conventional paper-making machine. As a practical matter liquids having a boiling point between about 40° and about 130° C. may be employed, preferably those boiling between 70° and 120° C., provided their specific gravity is at least 1.0. Among the liquids meeting these qualifications are carbon tetrachloride, isobutyl nitrate, ethyl nitrate, chloroform, methylene chloride, nitromethane, tetrachloroethylene, chloral, glyoxal, acetyl chloride, etc. and water itself. Of these, carbon tetrachloride and water are preferred because of their low cost, non-flammability, and lack of toxic properties.

The displacement of the air from the cork granules may readily be accomplished merely by stirring the granules into the desired liquid at room temperature and atmospheric pressure to form a mixture or slurry, particularly when the liquid is an organic liquid such as carbon tetrachloride. However, when water itself is employed to displace the air from the granules it is desirable to employ an elevated temperature and pressure in order to accelerate the displacement. The time, temperature and pressure will vary generally inversely with each other and also will vary with the particle size of the cork granules. For example, for a given particle size and a given pressure, the time required for displacement of the air will increase as the temperature is decreased. Similarly, at a given temperature and pressure the time required will increase as the particle size of the cork granules increases. As a practical matter, the mixture should be heated in contact with water exposed to steam at a gauge pressure of at least 30 p. s. i., preferably from 50 to 150 p. s. i. or even more in order to achieve the desired displacement within a reasonable length of time.

Displacement of the air with water may be accelerated somewhat by using wetting agents in the water. Any conventional wetting agent, such as soaps, sodium alkyl sulfonates, sodium alkyl aryl sulfonates, or any other wetting agent, of which a great many are known to those skilled in the art, may be employed.

While the proportion of cork granules to the liquid employed for displacing the air is not critical provided that sufficient liquid is present to displace all of the air, it has been found that mixtures of liquids with more than about 5% by weight of granules are so thick that they are difficult to handle. Accordingly, I prefer to mix about 1 to 5% by weight of the granules with the liquid.

The particle size of the cork granules likewise is not critical, but my invention is particularly adapted to cork granules which are larger than 100 mesh. In manufacturing cushion insoles I prefer to employ cork granules ranging in size from 10 to 40 mesh.

The fibrous material employed in forming the sheet may be any organic or inorganic fibrous material, including asbestos, glass fibers, nylon fibers, wool, cellulosic fibers such as cotton, particularly cotton linters, rayon fibers, kraft or other wood cellulose fibers and the like. The fibers are employed in the form of an aqueous slurry or a suspension which may contain any of the usual fillers, sizes, or binders commonly used in the felt- and papermaking art, including rubber-like as well as resinous binders. Particularly preferred are the wet-strengthening resins such as the formaldehyde resins including phenolformaldehyde, urea-formaldehyde and melamine-formaldehyde resins, which are preferably employed in an amount from about 0.5 to 5% or more by weight of the fibrous material, usually from 1 to 3% by weight.

The cork granules having first been treated to displace their air content with a suitable liquid as described above are preferably added to the aqueous slurry or suspension of fibers in a beater which rapidly disperses the granules substantially uniformly throughout the extent of the fibrous suspension.

The order of mixing of the various ingredients is not critical; excess liquid may be drained from the granules before they are mixed with the fiber, which is preferably in the form of an aqueous suspension, but this is not essential.

The aqueous suspension containing the fibers and the cork granules is then formed into a web or felt on a Fourdrinier machine in the conventional manner. If a particularly low density product is desired, the felt-forming operation may be carried out as described in Schur Patent No. 1,986,291, issued January 1, 1935.

Drying the felt in the conventional manner suffices to drive the water or other liquid from the interstices of the cork granules, resulting in a dry waterlaid felt product having cork granules substantially uniformly dispersed throughout the felted fibrous mass. The felt may be of any desired thickness; for the purpose of a cushion insole it may be of the order of one-eighth inch thick, and may be laminated with a layer of fibrous felt free from cork granules.

The following specific examples are intended to serve as illustrations of the nature of my invention but are not intended as limitations thereon.

*Example 1*

Ten pounds of cork granules screened to pass a 14-mesh screen and retained on a 28-mesh screen were stirred into 200 pounds of carbon tetrachloride using a paddle-type stirrer. The granules readily absorbed the liquid and rapidly became saturated with liquid, the air in the granules being completely displaced by the liquid, forming a thick slurry. As soon as all of the granules had been thoroughly saturated with the liquid, the excess liquid was drained from the mass and the granules containing the carbon tetrachloride were immediately added to a conventional felt-making furnish, consisting of an aqueous suspension of kraft fibers, in a beater. It is important that the granules from which the air has been displaced be added to the fiber suspension promptly after the excess carbon tetrachloride has been drained off or that they be kept in a closed container until used in order to avoid substantial evaporation of the carbon tetrachloride from the interstices of the granules which would result in the presence of air within the granules.

Upon addition of the granules to the fiber-containing suspension at the rate of one pound of granules per pound of fiber, the granules readily and quickly become substantially uniformly dispersed throughout the mass of the suspension. There is no tendency of the granules to float to the surface of the suspension as is the case when granules of this size are employed without first displacing the air from the granules.

A phenol-formaldehyde wet-strengthening resin was also added to the beater at the rate of 2% by weight of the fiber. The suspension was then felted on a Fourdrinier paper machine in the conventional manner, resulting in a felt which contained cork granules substantially uniformly distributed throughout its mass.

*Example 2*

Ten pounds of cork granules screened to pass a 14-mesh but be retained on a 28-mesh screen together with 250 pounds of water containing 0.05 pound of Triton X-100 as a wetting agent were charged into an autoclave. Steam was then admitted to the autoclave at 80 pounds per square inch gauge pressure and the mixture was stirred for 20 minutes while maintaining this pressure. The mixture was then cooled to about 100° F. and discharged to a screen where the excess water was allowed to drain away. The wet granules were found to have the air normally present therein displaced by water. Before substantial evaporation of the water contained in the granules occurred, they were added to an aqueous kraft fiber suspension (a conventional felt-making furnish) at the rate of one pound of cork granules for each pound of fiber. A phenol-formaldehyde wet-strengthening resin was also added at the rate of 1% by weight of the fibers and the suspension was thereafter treated as described in Example 1.

The resulting product was a highly resilient, flexible, felt-like material having cork granules distributed substantially uniformly throughout its mass and admirably suited for use as a cushion insole.

The screen mesh referred to herein is the Tyler standard screen.

The products of this invention, in addition to being useful as cushion insoles, are also of value as gaskets, bottle cap liners, anti-squeak materials, shock or vibration absorbers, rug underlay and the like, the presence of the large and well dispersed cork granules serving to increase greatly the resiliency of the felted product.

The proportion of cork granules to fiber by weight may be varied over a wide range, the weight of the cork granules varying from about 10 to about 90% by weight of the total cork granules and fibrous material. The exact proportion will depend upon the properties desired in the finished product; for cushion insoles the weight of cork granules is preferably from 40-60% of the total weight of cork and fiber and will vary more or less for other products depending upon the requirements of their intended use.

The felt may be impregnated with any of a wide variety of known binding or impregnating agents such as rubber (preferably in the form of latex) or resins etc., but in its preferred form the felt product is free from binding agents except for a small amount of wet-strengthening resin, being a loose, open, porous and resilient structure.

Although I have herein described specific embodiments of my invention, I do not intend to limit myself solely thereto but to include all of the obvious variations and modifications within the spirit and scope of the appended claims.

I claim:

1. In the fabrication of a waterlaid felt containing cork granules substantially uniformly dispersed therein from an aqueous suspension of a felt-making furnish containing cellulose fibers, the steps which comprise displacing the air from the cork granules with an organic liquid having a boiling point below about 130° C. and a specific gravity at least as great as water, and dispersing the liquid-containing granules in said aqueous suspension.

2. In the process of making a waterlaid felt containing cork granules larger than 100 mesh substantially uniformly dispersed therein from an aqueous suspension of a felt-making furnish containing cellulose fibers, the steps which comprise mixing cork granules larger than 100 mesh with an organic liquid having a boiling point from about 70° to about 120° C. and a specific gravity at least as great as water to form a mixture containing from 1 to 5% cork granules by weight and to displace the air from said granules with said liquid, and dispersing said liquid-containing granules in said aqueous suspension.

3. In the fabrication of a waterlaid felt containing cork granules larger than 100 mesh substantially uniformly dispersed therein from an aqueous suspension of a felt-making furnish containing cellulose fibers, the steps which comprise stirring cork granules larger than 100 mesh into liquid carbon tetrachloride to form a mixture containing from 1 to 5% cork granules by weight and to displace the air from said granules with carbon tetrachloride, draining exess carbon tetrachloride from said granules, and dispersing the liquid-containing granules in said aqueous suspension.

References Cited in the file of this patent

UNITED STATES PATENTS

| | | |
|---|---|---|
| 2,121,703 | Larson | June 21, 1938 |
| 2,375,008 | Lawrence | May 1, 1945 |
| 2,550,143 | Eger | Apr. 24, 1951 |